US012804475B2

(12) United States Patent
Zhao

(10) Patent No.: US 12,804,475 B2
(45) Date of Patent: Nov. 17, 2026

(54) COMMUNICATION METHOD, COMMUNICATION APPARATUS AND STORAGE MEDIUM

(71) Applicant: Beijing Xiaomi Mobile Software Co., Ltd., Beijing (CN)

(72) Inventor: Wensu Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 530 days.

(21) Appl. No.: 18/351,606

(22) Filed: Jul. 13, 2023

(65) Prior Publication Data

US 2023/0362739 A1 Nov. 9, 2023

Related U.S. Application Data

(63) Continuation of application No. PCT/CN2021/071932, filed on Jan. 14, 2021.

(51) Int. Cl.
*H04W 28/26* (2009.01)
*H04L 1/1812* (2023.01)
*H04W 72/25* (2023.01)

(52) U.S. Cl.
CPC ........... *H04W 28/26* (2013.01); *H04L 1/1812* (2013.01); *H04W 72/25* (2023.01)

(58) Field of Classification Search
CPC .... H04W 72/25; H04W 28/26; H04L 1/1812; H04L 1/1671; H04L 5/0055; H04L 5/0062; H04L 1/1854; H04L 1/1861
See application file for complete search history.

(56) References Cited

U.S. PATENT DOCUMENTS

2022/0015099 A1* 1/2022 Fouad .................. H04W 76/14
2022/0030613 A1* 1/2022 Wang .................... H04W 72/20
2023/0164815 A1* 5/2023 Liu ....................... H04L 5/0044 370/329
2023/0164825 A1* 5/2023 Deng .................... H04W 72/02 370/329

(Continued)

FOREIGN PATENT DOCUMENTS

CN 106550318 A 3/2017
CN 110972290 A 4/2020

(Continued)

OTHER PUBLICATIONS

International Search Report and Written Opinion of International Application No. PCT/CN2021/071932, mailed Sep. 29, 2021, 14 pages.

(Continued)

*Primary Examiner* — Huy D Vu
*Assistant Examiner* — Bao G Nguyen
(74) *Attorney, Agent, or Firm* — Finnegan, Henderson, Farabow, Garrett & Dunner, L.L.P.

(57) ABSTRACT

A communication method is performed by a first user equipment (UE), and includes: sending a potential collision indication to a second UE in response to determining an impending resource collision on a reserved resource for data transmission by the second UE, wherein the potential collision indication indicates the impending resource collision on the reserved resource for data transmission by the second UE.

12 Claims, 8 Drawing Sheets

(56) References Cited

U.S. PATENT DOCUMENTS

2023/0247590 A1* 8/2023 Wu .................. H04W 74/0825
370/329

FOREIGN PATENT DOCUMENTS

WO WO 2020092939 A1 5/2020
WO WO 2020146893 A1 7/2020

OTHER PUBLICATIONS

Search Report for EP Application No. 21918484.3, dated Feb. 5, 2024, 8 pages.
ITRI, 3GPP TSG RAN WG1 Meeting #103-e, "Discussion on Enhancement for NR V2X Mode 2", R1-2007878, e-Meeting, Oct. 26-Nov. 13, 2020, 5 pages.
Qualcomm Incorporated, 3GPP TSG RAN W61 Meeting #102-e, "Reliability and Latency Enhancements for Mode 2", R1-2006829, Aug. 17-28, 2020, 9 pages.
Office Action dated Feb. 15, 2024, in Russian Patent Application No. 2023120194, 12 pages.
ASUStek, "Discussion on sidelink physical layer procedure on NR V2X", 3GPP TSG RAN WG1 #99, R1-1912906, Reno, USA, Nov. 18-22, 2019, 12 pages.
Notice of final examination opinions for Japanese Patent Application No. 2023-542807, dated Oct. 22, 2024, 6 pages.

* cited by examiner

COMMUNICATION METHOD, COMMUNICATION APPARATUS AND STORAGE MEDIUM

CROSS-REFERENCE TO RELATED APPLICATION

This application is a continuation of International Application No. PCT/CN2021/071932, filed on Jan. 14, 2021, the entire content of which is incorporated herein by reference.

TECHNICAL FIELD

The disclosure relates to the field of communication technologies, and in particular, to a communication method, a communication apparatus, and a storage medium.

BACKGROUND

With the development of long term evolution (LTE) wireless communication protocols, the third generation partnership (3GPP) is formulating a sidelink standard as a direct communication standard from one terminal to another terminal. A first standard of a new radio (NR) sidelink has been completed in release 16 since July 2020. A solution of the NR sidelink is mainly applied to vehicle to everything (V2X) and public security. For the V2X and public security, release 16 does not fully support service requirements and operating schemes due to time constraints, but service and system aspects (SA) are enhanced in release 17 NR Sidelink. For example, architecture enhancement and system enhancement for supporting advanced V2X services for the 3GPP has been added in release 17. In addition, other business cases related to the NR sidelink are being studied in an SA workgroup, such as a network-controlled interaction service, an enhanced energy efficiency relay, a wide coverage, and an audio-visual service production.

SUMMARY

According to a first aspect of the disclosure, a communication method is provided. The method is applicable to a first user equipment (UE). The method includes: sending a potential collision indication to a second UE in response to determining an impending resource collision on a reserved resource for data transmission by the second UE, the potential collision indication for indicating the impending resource collision on the reserved resource for data transmission by the second UE.

According to a second aspect of the disclosure, a communication method is provided. The method is applicable to a second UE. The method includes: receiving a potential collision indication from a first UE, the potential collision indication for indicating an impending resource collision on a reserved resource for data transmission by the second UE; and performing resource selection according to the potential collision indication.

According to a third aspect of the disclosure, a communication device is provided. The communication device includes: a processor; and a memory for storing instructions executable by the processor. The processor is configured to perform the communication method described in the first aspect.

According to a fourth aspect of the disclosure, a communication device is provided. The communication device includes: a processor; and a memory for storing instructions executable by the processor. The processor is configured to perform the communication method described in the second aspect.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different accompanying drawings represent the same or similar elements unless otherwise represented. The implementations set forth in the following description of the embodiments do not represent all implementations consistent with the disclosure. Instead, they are merely examples of apparatuses and methods consistent with aspects related to the disclosure as recited in the appended claims.

Figure 1:
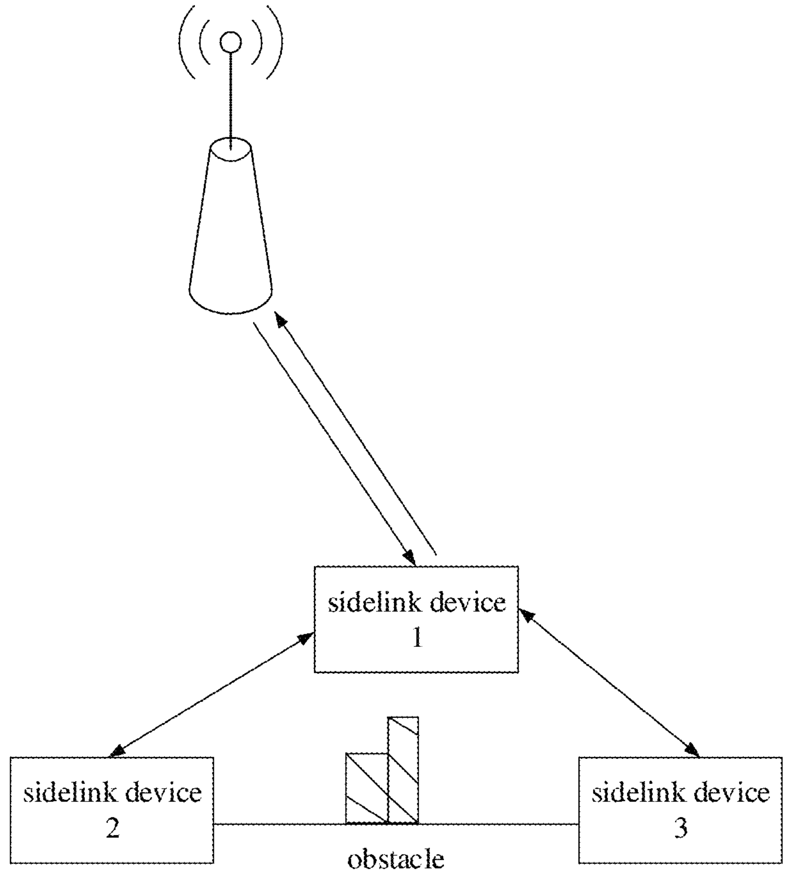
FIG. 1 is a schematic diagram of a sidelink communication system according to some embodiments.

A communication method provided in embodiments of the disclosure is applicable to a sidelink communication system as illustrated in FIG. 1. As illustrated in FIG. 1, in a sidelink scenario among sidelink devices, a network device configures transmission parameters for data transmission for sidelink device 1. Sidelink transmission is performed on sidelink device 1, sidelink device 2, and sidelink device 3. There may be an obstacle between sidelink device 2 and sidelink device 3. Communication links between the network device and sidelink device 1 are an uplink and a downlink. A link between a sidelink device and another sidelink device is a sidelink.

In the disclosure, a sidelink communication scenario among sidelink devices may be a vehicle to everything (V2X) service scenario. V represents a vehicle-mounted device and X represents any object that interacts with the vehicle-mounted device. X mainly includes a vehicle-mounted device, a handheld device, a traffic side infrastructure, and a network. Information patterns of V2X interaction include vehicle to vehicle (V2V) interaction, vehicle to infrastructure (V2I) interaction, vehicle to pedestrian (V2P) interaction, and vehicle to network (V2N) interaction.

With the development of the new fifth generation (5G) mobile communication technology, the 5GNR technology is used in 3GPP Rel-16 to support new V2X communication services and scenarios, such as vehicles platooning, extended sensors, advanced driving, and remote driving. In general, the 5G V2X sidelink may provide higher communication rate, shorter communication delay, and more reliable communication quality.

The sidelink communication scenario among sidelink devices may be a device to device (D2D) communication scenario. In embodiments of the disclosure, the sidelink devices for sidelink communication may include various handheld devices, vehicle-mounted devices, wearable devices, and computing devices, which are with wireless communication functions, or other processing devices connected to wireless modems, as well as various forms of UEs, mobile stations (MSs), terminals, terminal equipments, etc. For convenience of description, in embodiments of the disclosure, it is illustrated by taking a sidelink device being a UE for an example.

The NR sidelink enhancement may improve transmission reliability and reduce delay. In the NR sidelink enhancement, a 3GPP work group has concluded that a manner for assisting in resource selection between UEs is required in enhancing a Mode2 resource allocation. Two UEs are specified in the manner. For example, UE A (UEA) is an assistance UE of UE B (UEB) and UEB refers to a UE that needs to select a resource for data that to be sent by UEB itself. UEA may determine a resource set and sends the resource set to UEB by means of a Mode2 and UEB may consider the resource set sent by UEA when selecting the resource(s). That is, it can be understood as UEB uses an assistance resource set assistance mechanism for resource selection. UEB may send data to UEA and/or other UE.

In the Mode 2 resource allocation manner, resource selection is performed in a resource-aware manner. The UE decodes sidelink control information (SCI) and measures a demodulation reference signal (DMRS) of a physical sidelink shared channel (PSSCH) to determine a candidate resource set. However, due to the half-duplex problem, when UEB sends SCI, it may not receive SCI from other UE (such as UE C (UEC)) in the same slot, resulting in a time-frequency resource reserved for UEB overlapping with a time-frequency resource reserved for other UE, that is, information fields of time resource assignment and frequency resource assignment carried in SCIs of UEB and other UE are the same. This may lead to an impending resource collision on a reserved resource for data transmission by the UE, that is, a potential collision.

In the NR sidelink enhancement, user equipment (UE) A that is for the sidelink communication may send an assistant resource set to UEB whose resource selection mode is a Mode2, and the UEB takes this into consideration when performing resource selection on its own data transmission. However, in the related art, a candidate resource determined by the UEB in the assistant resource set provided by the UEA for the UEB may overlap with resources reserved for other UEs, thus an impending resource collision on the reserved resource for data transmission by the second UE may occur.

Figure 2:
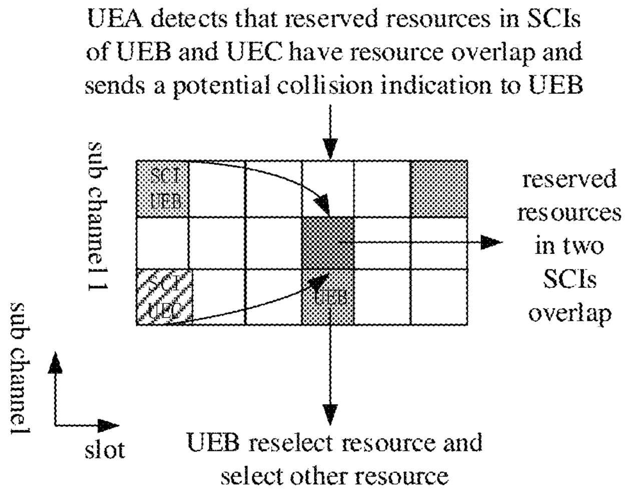
FIG. 2 is a schematic diagram illustrating an impending resource collision on a reserved resource according to some embodiments.

FIG. 2 is a schematic diagram illustrating an impending resource collision on a reserved resource. Referring to FIG. 2, in sub channel 1, UEA decodes SCI of UEB to obtain a reserved resource and decodes SCI of UEC, and the obtained reserved resources of UEB and UEC have resource overlap. When UEB performs data transmission, a resource collision may occur when the overlapped time-frequency resource is used. In the related art, UEA may detect that the reserved resources in the respective SCIs of UEB and UEC overlap, that is, it may determine an impending resource collision on the reserved resource for data transmission by UEB.

To perform the resource allocation enhancement, it is necessary to reduce the potential collision occurrence probability. Embodiments of the disclosure provide a communication method. In an event that an impending resource collision on a reserved resource for data transmission by the UE is determined, a potential collision indication is sent to the UE. The potential collision indication is configured to indicate whether there is the impending resource collision on the reserved resource for data transmission by the UE. The indication of whether there is the impending resource collision on the reserved resource for data transmission is realized. The UE selects a resource according to the potential collision indication, which reduces the probability of selecting the resource that has the impending resource collision and reduces the potential collision occurrence probability.

In an implementation, when UEA providing the assistant resource set in the above example detects that the reserved resources in the respective SCIs of UEB and UEC overlap, that is, when the impending resource collision on the reserved resource for data transmission by UEB is determined, UEA sends the potential collision indication to UEB. The potential collision indication is configured to indicate whether there is the impending resource collision on the reserved resource for data transmission by UEB. After receiving the potential collision indication, UEB performs resource reselection to reduce the potential collision occurrence probability.

In the embodiments of the disclosure, for convenience of description, the UE that provides the assistant resource set is referred to as the first UE and the UE that uses the assistant resource set assistance mechanism for resource selection is referred to as the second UE.

Figure 3:
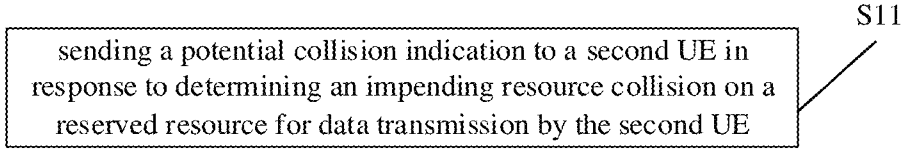
FIG. 3 is a flow chart of a communication method according to some embodiments.

FIG. 3 is a flow chart of a communication method according to some embodiments. As illustrated in FIG. 3, the communication method is applicable to the first UE and includes the following step.

In step S11, a potential collision indication is sent to a second UE in response to determining an impending resource collision on a reserved resource for data transmission by the second UE.

The potential collision indication is configured to indicate the impending resource collision on the reserved resource for data transmission by the second UE.

In some embodiments of the disclosure, the first UE determines whether there is the impending resource collision on the reserved resource for data transmission by the second UE, by detecting whether reserved resources in the respective SCIs of the second UE and the other UE overlap in the time domain and/or frequency domain. If the reserved resources in the respective SCIs of the second UE and the other UE overlap in the time domain and/or frequency domain, the impending resource collision on the reserved resource for data transmission by the second UE is determined.

In the communication method provided in the embodiments of the disclosure, when the impending resource collision on the reserved resource for data transmission by the second UE is determined, the potential collision indication is sent to the second UE, so as to realize the indication whether there is the impending resource collision on the reserved resource for data transmission.

In an implementation of the communication method provided in the embodiments of the disclosure, the potential collision indication is sent to the second UE by using a physical sidelink feedback channel (PSFCH) resource mapped by a current physical sidelink shared channel (PSSCH) transmission resource of the second UE. The current PSSCH transmission resource of the second UE may be understood as a corresponding PSSCH transmission resource on a slot located by a physical sidelink control channel (PSCCH) for indicating a reserved time-frequency resource for a next PSSCH transmission of the second UE.

In the embodiments of the disclosure, for convenience of description, the current PSSCH of the second UE is referred to as the first PSSCH. The PSCCH for indicating the reserved time-frequency resource for the next PSSCH transmission is referred to as the first PSCCH.

Figure 4:
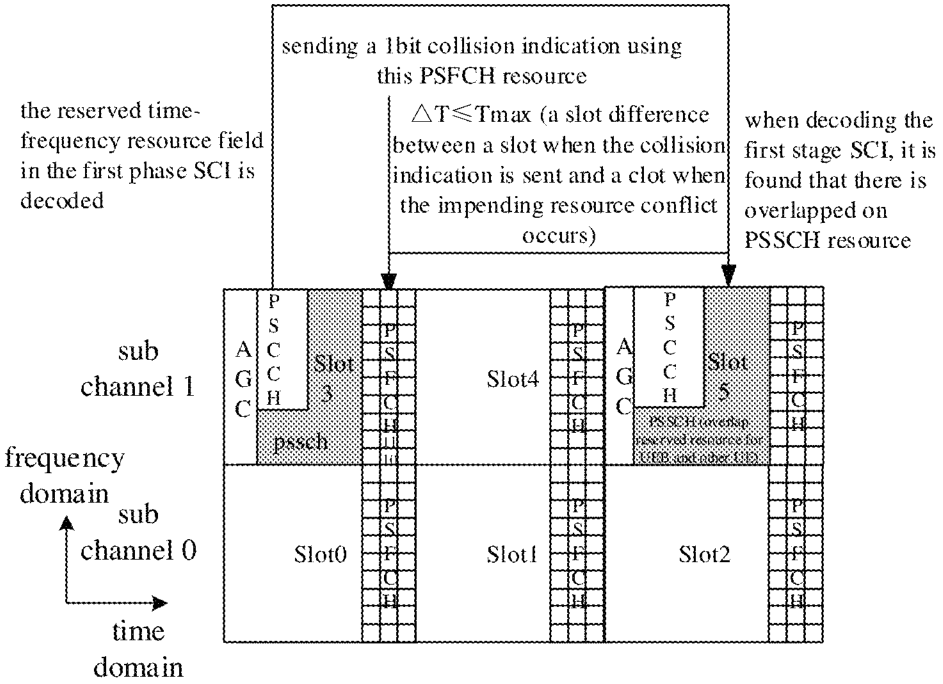
FIG. 4 is a schematic diagram illustrating a PSFCH resource for transmitting a potential collision indication according to some embodiments of the disclosure.

FIG. 4 is a schematic diagram illustrating a PSFCH resource for transmitting a potential collision indication according to some embodiments of the disclosure. Referring to FIG. 4, the PSCCH in Slot3 may be understood as the first PSCCH. The first PSCCH is configured to indicate a time-frequency resource for a next PSSCH (the PSSCH in Slot5) transmission. The PSSCH corresponding to the slot where the first PSCCH is located in Slot3 may be understood as the first PSSCH. The PSFCH resource mapped by the first PSSCH transmission resource may be understood as the PSFCH in Slot3.

Figure 5:
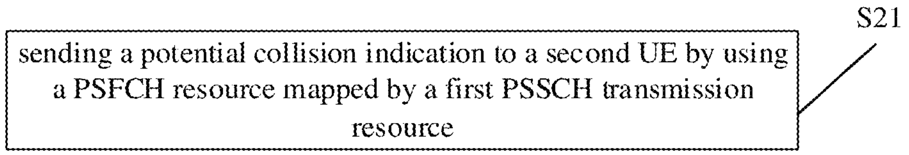
FIG. 5 is a flow chart of a communication method according to some embodiments.

FIG. 5 is a flow chart of a communication method according to some embodiments. As illustrated in FIG. 5, the communication method is applicable to the first UE and includes the following step.

In step S21, a potential collision indication is sent to a second UE by using a PSFCH resource mapped by a first PSSCH transmission resource.

The first PSSCH is a PSSCH on a slot where the first PSCCH is located and the first PSCCH is a PSCCH for indicating a reserved time-frequency resource for a next PSSCH transmission.

The following describes the process of determining the PSFCH resource mapped by the first PSSCH transmission resource by taking the first UE as UEA and the second UE as UEB.

In an example, it is assumed that UEA is an assistant UE and a receiving UE of UEB and one PSSCH resource is reserved for one PSCCH. The mapping rule between PSSCH transmission resources and PSFCH transmission resources may be: in a resource pool, slots available for the PSFCH are indicated by a high-layer signaling parameter (e.g., period PSFCH resource parameter), such as in the high-layer signaling parameter, the PSFCH is configured to be sent every several slots. A min time gap between the PSSCH and the PSFCH is specified in the high layer signaling parameter.

In the embodiments of the disclosure, according to the mapping rule between PSSCH transmission resources and PSFCH transmission resources, a PSFCH candidate resource mapped by the first PSSCH transmission resource may be determined and the PSFCH candidate resource may be used as the PSFCH candidate resource for sending the potential collision indication. The PSFCH transmission resource for sending the potential collision indication is determined by formula 1.

$$PSFCHindex = (P_{ID} + M_{ID}) \bmod R_{PRB,CS}^{PSFCH} \qquad \text{formula 1}$$

$P_{ID}$ is a physical layer resource identifier provided by the second-stage SCI-A or the second-stage SCI-B. $M_{ID}$ is 0 in case of unicast. When the service type is 01 for multicast HARQ-NACK feedback mechanism, $M_{ID}$ is 0. When the service type is 01 for multicast HARQ-NACK\ACK feedback, $M_{ID}$ is a value of a multicast member ID of a receiver.

$$R_{PRB,CS}^{PSFCH}$$

represents a number of cyclic shifts of ACK/NACK feedback that can be carried in all physical resource blocks (PRBs) in the PSFCH candidate resource.

In an implementation of the embodiments of the disclosure, referring to FIG. 4 continually, by decoding the first stage SCI (the first PSCCH in Slot3), the first UE decodes to obtain time resource assignment and frequency resource assignment and determines a PSSCH data transmission resource in Slot5. Therefore, based on the PSFCH resource in Slot3, the first UE sends the potential collision indication to the second UE to indicate the impending resource collision on the PSSCH data transmission of the second UE in Slot5.

In the communication method provided in the embodiments of the disclosure, a time interval ΔT between a moment when the potential collision indication is sent to the second UE and a moment when the impending resource collision occurs to the second UE, is greater than or equal to a time interval threshold Tmax, so that the second UE receives the potential collision indication to perform resource selection before the moment when the impending resource collision occurs to the second UE.

In an implementation, the time interval threshold may be indicated by a radio resource control (RRC) signaling. The first UE determines the time interval threshold Tmax according to the RRC signaling. For example, in FIG. 4, UEA uses the PSFCH resource corresponding to the current PSSCH resource of UEB to transmit a 1-bit potential collision indication, and the maximum time interval Tmax between the moment when the potential collision indication is sent and the moment when the potential collision occurs, is specified by the RRC signal. ΔT (a slot difference between a slot when the potential collision indication is sent and a slot when the potential collision occurs)≤Tmax. FIG. 4 may also be understood as a design in which the Min time gap potential collision of the potential collision indication sent using the PSFCH resource is 0 slot.

In the related art, the PSFCH resource is used for transmitting a 1-bit hybrid automatic repeat request (HARQ) feedback. Therefore, in the embodiments of the disclosure, the PSFCH resource used for transmitting the potential collision indication may be understood as the PSFCH resource for transmitting the HARQ feedback.

Figure 6:
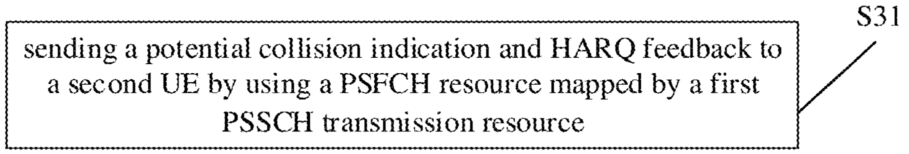
FIG. 6 is a flow chart of a communication method according to some embodiments.

FIG. 6 is a flow chart of a communication method according to some embodiments. As illustrated in FIG. 6, the communication method is applicable to the first UE and includes the following step.

In step S31, HARQ feedback and a potential collision indication are sent to a second UE by using a PSFCH resource mapped by a first PSSCH transmission resource.

In some embodiments of the disclosure, the HARQ feedback that is sent to the second UE by using the PSFCH resource mapped by the first PSSCH transmission resource may be the 1-bit HARQ feedback.

In some embodiments of the disclosure, the potential collision indication that is sent to the second UE by using the PSFCH resource mapped by the first PSSCH transmission resource may be the 1-bit potential collision indication.

The PSFCH used to carry the HARQ feedback and the potential collision indication in the embodiments of the disclosure may be understood as a new PSFCH format. In the embodiments of the disclosure, the new PSFCH format is referred to as a first PSFCH format.

Figure 7:
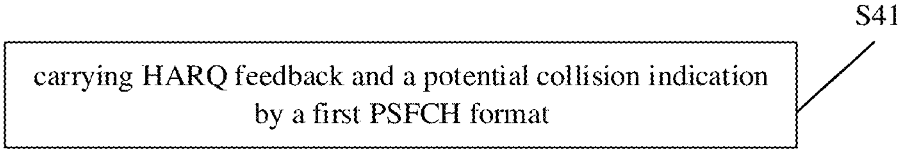
FIG. 7 is a flow chart of a communication method according to some embodiments.

FIG. 7 is a flow chart of a communication method according to some embodiments. As illustrated in FIG. 7, the communication method is applicable to the first UE and includes the following step.

In step S41, HARQ feedback and a potential collision indication are carried by a first PSFCH format.

In the embodiments of the disclosure, the HARQ feedback and the potential collision indication are sent by the PSFCH resource in the first PSFCH format.

In the embodiments of the disclosure, the potential collision indication and the HARQ feedback may multiplex the same PSFCH resource or may not multiplex the PSFCH resource.

In an implementation, in the communication method provided in the embodiments of the disclosure, the potential collision indication and the HARQ feedback may multiplex the PSFCH resource with the same time and frequency domain.

Figure 8:
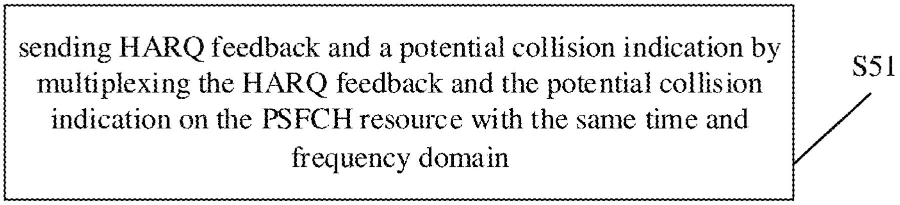
FIG. 8 is a flow chart of a communication method according to some embodiments.

FIG. 8 is a flow chart of a communication method according to some embodiments. As illustrated in FIG. 8, the communication method is applicable to the first UE and includes the following step.

In step S51, HARQ feedback and a potential collision indication are sent by multiplexing the HARQ feedback and the potential collision indication on the PSFCH resource with the same time and frequency domain.

In some embodiments of the disclosure, the potential collision indication may be the 1-bit potential collision indication and the HARQ feedback may be the 1-bit HARQ feedback.

The embodiments of the disclosure may design a new 2-bit PSFCH format to transmit the HARQ feedback and the potential collision indication at the same time. That is, the newly designed 2-bit PSFCH format is used to carry the 1-bit ACK/NACK feedback and the 1-bit potential collision indication.

In the embodiments of the disclosure, in order to distinguish the HARQ feedback and the potential collision indication, a cyclic shift may be designed to distinguish the HARQ feedback and the potential collision indication. That is, the existing 2-bit HARQ feedback mechanism is reused.

Figure 9:
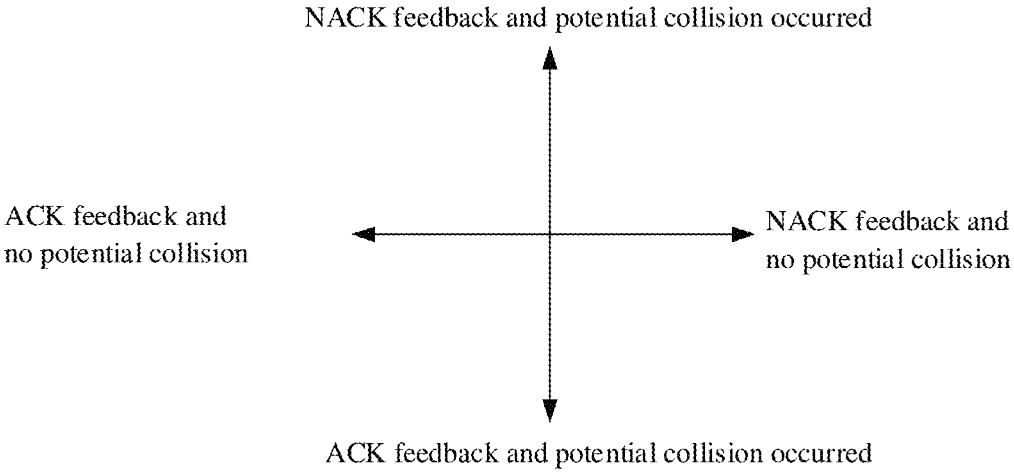
FIG. 9 is a schematic diagram of distinguishing HARQ feedback and a potential collision indication by cycle shifting according to some embodiments of the disclosure.

In some embodiments, a base sequence is sent by using the PSFCH resource with the same time and frequency domain and the base sequence is cyclically shifted to indicate the HARQ feedback and potential collision indication. In an example, the PSFCH resource with the same time and frequency domain is used in the embodiments of the disclosure to transmit a base sequence with a length of 12 and the base sequence may carry the transmitted information after being cyclically shifted. For example, the sequence is mapped on a single physical resource block (PRB) and a single orthogonal frequency division multiplexing (OFDM) symbol, that is, the 1-bit potential collision indication and the 1-bit HARQ feedback. FIG. 9 is a schematic diagram of distinguishing HARQ feedback and a potential collision indication by cycle shifting according to some embodiments of the disclosure. As illustrated in FIG. 9, there are 4 cycle shifts when the rotation is performed in units of π/2. The phase is 0, which means (N, +collision) and means NACK feedback and potential collision occurred. The phase is π/2, which means (N, −collision) and means NACK feedback and no potential collision. The phase is π, which means (ACK, +collision) and means ACK feedback and potential collision occurred. The phase is 3π/2, which means (ACK, −collision) and means ACK feedback and no potential collision.

In another implementation, in the communication method provided in the embodiments of the disclosure, the potential collision indication and the HARQ feedback may not multiplex the PSFCH resource.

The potential collision indication and the HARQ feedback may use the PSFCH resource in a frequency division multiplexing (FDM) manner. For example, the HARQ feedback and the potential collision indication are sent on different frequency domain resources.

For convenience of description in the embodiments of the disclosure, the frequency domain for sending the HARQ feedback is called the first frequency domain and the frequency domain for sending the potential collision indication is called the second frequency domain.

Figure 10:
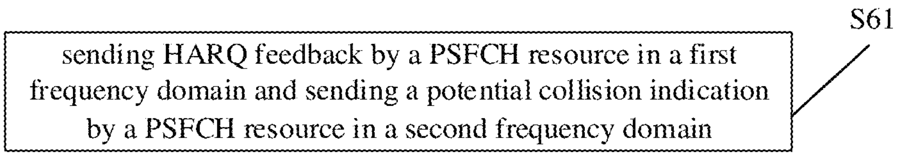
FIG. 10 is a flow chart of a communication method according to some embodiments.

FIG. 10 is a flow chart of a communication method according to some embodiments. As illustrated in FIG. 10, the communication method is applicable to the first UE and includes the following step.

In step S61, HARQ feedback is sent by a PSFCH resource in a first frequency domain and a potential collision indication is sent by a PSFCH resource in a second frequency domain.

In the communication method provided in the embodiments of the disclosure, different frequency domain resources may be configured for the potential collision indication and the HARQ feedback respectively.

Figure 11:
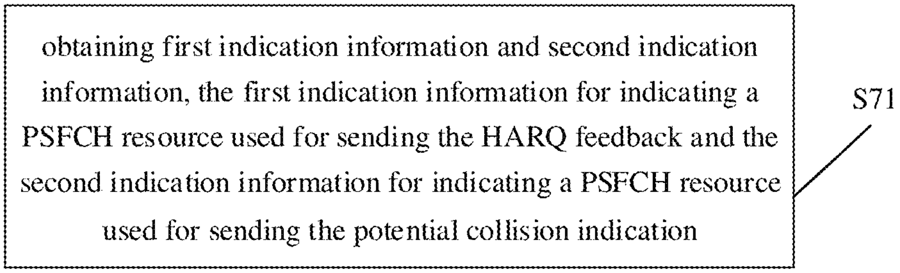
FIG. 11 is a flow chart of a communication method according to some embodiments.

FIG. 11 is a flow chart of a communication method according to some embodiments. As illustrated in FIG. 11, the communication method is applicable to the first UE and includes the following step.

In step S71, first indication information and second indication information are obtained.

The first indication information is used for indicating a PSFCH resource used for sending the HARQ feedback and the second indication information is used for indicating a PSFCH resource used for sending the potential collision indication.

In an implementation, two parameter values may be introduced in the embodiments of the disclosure to indicate the PSFCH resource used for sending the HARQ feedback and the PSFCH resource used for sending the potential collision indication.

In an example, the parameter value sl-PSFCH-HARQ-RB-Set-r16 is introduced to represent the resource for the HARQ feedback and the parameter value sl-PSFCH-precollsion-RB-Set-r16 is introduced to represent the resource for the potential collision indication.

In the communication method provided in the embodiment of the disclosure, different frequency domain resources may be configured for the potential collision indication and the HARQ feedback respectively by RRC. For example, the parameter value sl-PSFCH-HARQ-RB-Set-r16 for indicating the resource for the HARQ feedback may be introduced in the RRC signaling and the parameter value sl-PSFCH-precollsion-RB-Set-r16 for indicating the resource for the potential collision indication may be introduced in the RRC signaling.

It may be understood that, in the communication protocol of R16, frequency domain resources used for PSFCH transmission among the candidate resources of the PSFCH are pre-configured by RRC and are realized in the frequency domain by the PRB set indicated by a bitmap. In one way, the higher layer parameter sl-PSFCH-RB-Set-r16 BIT STRING (SIZE (10 . . . 275)) is used, which indicates a bitmap with a length of 10 to 275. In the communication method provided in the embodiment of the disclosure, by introducing the following two parameter values, it is ensured that the mapping criteria from PSSCH to potential collision indication and HARQ feedback resources are the same.

Two parameter values:

sl-PSFCH-HARQ-RB-Set-r16 BIT STRING (SIZE (10 . . . 275))

sl-PSFCH-precollsion-RB-Set-r16 BIT STRING (SIZE (10 . . . 275)).

In the communication method provided in the embodiment of the disclosure, the PSFCH resource in the first frequency domain and the PSFCH resource in the second frequency domain have the same time domain resource.

Figure 12:
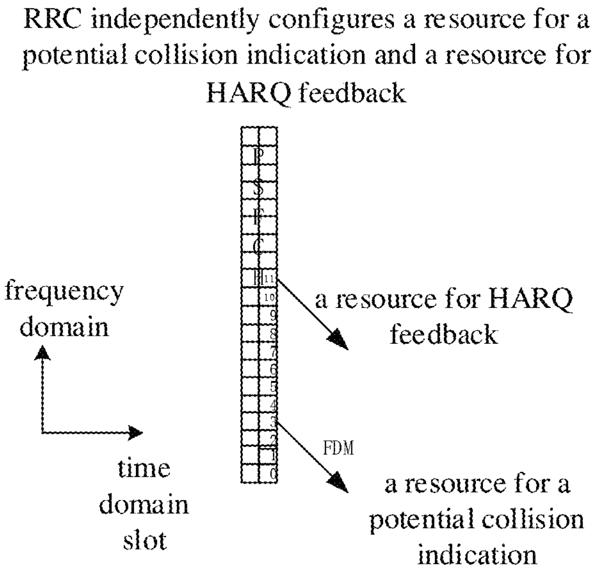
FIG. 12 is a schematic diagram illustrating an independent configuration of a resource for a potential collision indication and a resource for HARQ feedback by an RRC signaling, according to some embodiments.

FIG. 12 is a schematic diagram illustrating an independent configuration of a resource for a potential collision indication and a resource for HARQ feedback by an RRC signaling, according to some embodiments. Referring to FIG. 12, a PRB with a sequence number 3 on the PSFCH resource is used to indicate the resource for transmitting the HARQ feedback and a PRB with a sequence number 11 on the PSFCH resource is used to indicate the resource for transmitting the potential collision indication.

In the communication method provided in the embodiment of the disclosure, the HARQ feedback and the potential collision indication may be sent in different time domains.

For convenience of description in the embodiments of the disclosure, the moment for sending the HARQ feedback is referred to as the first moment and the moment for sending the potential collision indication is referred to as the second moment.

Figure 13:
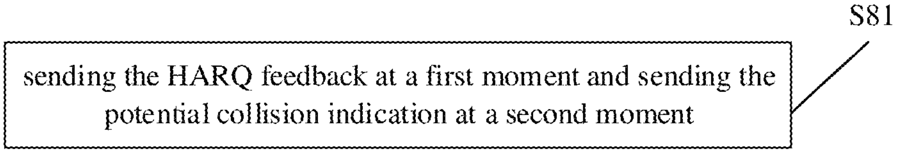
FIG. 13 is a flow chart of a communication method according to some embodiments.

FIG. 13 is a flow chart of a communication method according to some embodiments. As illustrated in FIG. 13, the communication method is applicable to the first UE and includes the following step.

In step S81, HARQ feedback is sent at a first moment and a potential collision indication is sent at a second moment. The second moment is earlier than the first moment.

In the communication method provided in the embodiment of the disclosure, the PSFCH resource is not multiplexed, the HARQ is fed back at moment T1, the potential collision indication is fed back at moment T2, and T2<T1.

In some embodiments, a frequency domain resource of the HARQ feedback sent at the first moment and the frequency domain resource of the potential collision indication sent at the second moment may also be different.

In the communication method provided in the embodiment of the disclosure, different frequency domain resources may be configured for the potential collision indication and the HARQ feedback respectively.

In one manner, the first UE may obtain the first indication information and the second indication information. The first indication information is used to indicate the PSFCH resource used for sending the HARQ feedback and the second indication information is used to indicate the PSFCH resource used for sending the potential collision indication.

In an implementation, two parameter values may be introduced in the embodiments of the disclosure to indicate the PSFCH resource used for sending the HARQ feedback and the PSFCH resource used for sending the potential collision indication.

In an example, the parameter value sl-PSFCH-HARQ-RB-Set-r16 is introduced to indicate the resource for the HARQ feedback and the parameter value sl-PSFCH-precollsion-RB-Set-r16 is introduced to indicate the resources for the potential collision indication.

In the communication method provided in the embodiment of the disclosure, different frequency domain resources may be configured for the potential collision indication and the HARQ feedback respectively by RRC. For example, the parameter value sl-PSFCH-HARQ-RB-Set-r16 for indicating the resource for the HARQ feedback may be introduced in the RRC signaling and the parameter value sl-PSFCH-precollsion-RB-Set-r16 for indicating the resource for the potential collision indication may be introduced in the RRC signaling.

In the embodiments of the disclosure, the PSSCH needs to be decoded and a cyclic redundancy check (CRC) needs to be completed until the data is decoded correctly before the HARQ feedback is sent. However, to detect whether the potential collision occurs, it may be determined by decoding the first-stage SCI. Thus the moment when the potential collision indication is detected is earlier than the moment when the data decoding is completed. Therefore, the moment for sending the potential collision indication is set to be earlier than the moment for sending the HARQ feedback. Furthermore, in the communication method provided in the embodiment of the disclosure, the HARQ and the potential collision indication are respectively fed back at different moments, which may improve the communication efficiency.

In the communication method provided in the embodiment of the disclosure, when the first UE determines the impending resource collision on the reserved resource for data transmission, it sends the potential collision indication to the second UE, so as to realize the indication whether there is the impending resource collision on the reserved resource for data transmission.

In some embodiments of the disclosure, the first UE sends the potential collision indication to the second UE. The second UE receives the potential collision indication sent by the first UE and may perform resource reselection according to the potential collision indication to reduce the collision probability.

Figure 14:
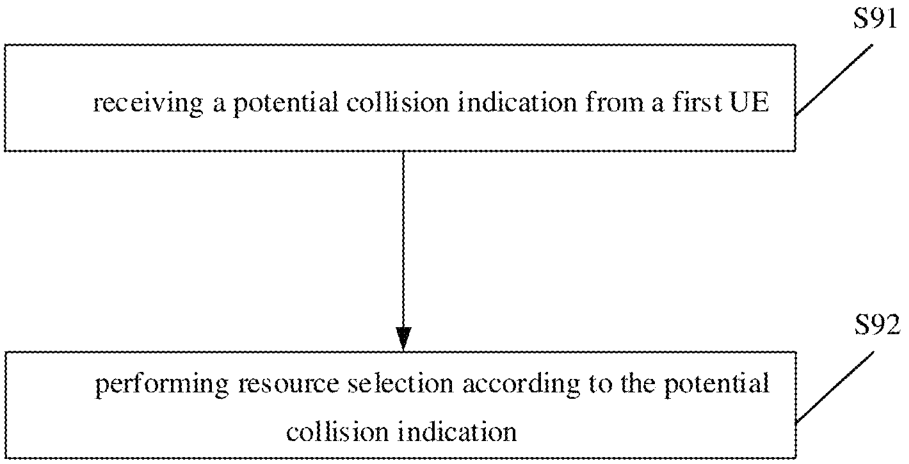
FIG. 14 is a flow chart of a communication method according to some embodiments.

FIG. 14 is a flow chart of a communication method according to some embodiments. As illustrated in FIG. 14, the communication method is applicable to the second UE and includes the following steps.

In step S91, a potential collision indication is received from a first UE.

The potential collision indication is configured to indicate an impending resource collision on a reserved resource for data transmission by the second UE.

In step S92, resource selection is performed according to the potential collision indication.

In the embodiments of the disclosure, the second UE receives the potential collision indication, and based on the received potential collision indication, performs resource reselection to avoid the occurrence of the potential collision. For example, a resource selected by the second UE for resource reselection may be different from the reserved resource of the imminent resource collision.

Figure 15:
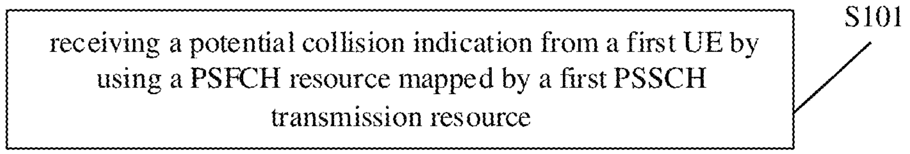
FIG. 15 is a flow chart of a communication method according to some embodiments.

FIG. 15 is a flow chart of a communication method according to some embodiments. As illustrated in FIG. 15, the communication method is applicable to the second UE and includes the following step.

In step S101, a potential collision indication is received from a first UE by using a PSFCH resource mapped by a first PSSCH transmission resource.

The first PSSCH is a PSSCH on a slot where a first PSCCH is located and the first PSCCH is a PSCCH for indicating a reserved time-frequency resource for a next PSSCH transmission.

In the communication method provided in the embodiments of the disclosure, a time interval $\Delta T$ between a moment when the potential collision indication is sent to the second UE and a moment when the impending resource collision occurs to the second UE, is greater than or equal to a time interval threshold Tmax, so that the second UE receives the potential collision indication to perform resource selection before the moment when the impending resource collision occurs to the second UE.

Figure 16:
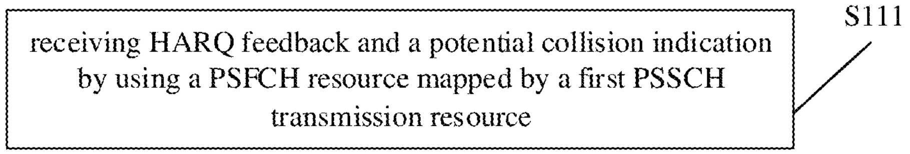
FIG. 16 is a flow chart of a communication method according to some embodiments.

FIG. 16 is a flow chart of a communication method according to some embodiments. As illustrated in FIG. 16, the communication method is applicable to the second UE and includes the following step.

In step S111, HARQ feedback and a potential collision indication are received by using a PSFCH resource mapped by a first PSSCH transmission resource.

In the embodiments of the disclosure, the HARQ feedback received by using the PSFCH resource mapped by the first PSSCH transmission resource may be the 1-bit HARQ feedback.

In the embodiments of the disclosure, the potential collision indication received by using the PSFCH resource mapped by the first PSSCH transmission resource may be the 1-bit potential collision indication.

The PSFCH resource used for receiving the HARQ feedback and the potential collision indication in the embodiments of the disclosure may be understood as a new PSFCH resource. In the embodiments of the disclosure, the PSFCH format corresponding to the new PSFCH resource is referred to as the first PSFCH format.

Figure 17:
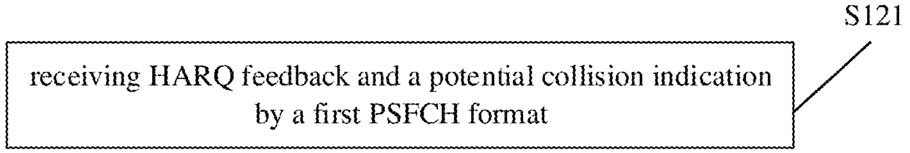
FIG. 17 is a flow chart of a communication method according to some embodiments.

FIG. 17 is a flow chart of a communication method according to some embodiments. As illustrated in FIG. 17, the communication method is applicable to the second UE and includes the following step.

In step S121, HARQ feedback and a potential collision indication are received by a first PSFCH format.

In the embodiments of the disclosure, the potential collision indication and the HARQ feedback may multiplex the same PSFCH resource or may not multiplex the PSFCH resource.

In an implementation, in the communication method provided in the embodiments of the disclosure, the potential collision indication and the HARQ feedback may multiplex the PSFCH resource with the same time and frequency domain.

Figure 18:
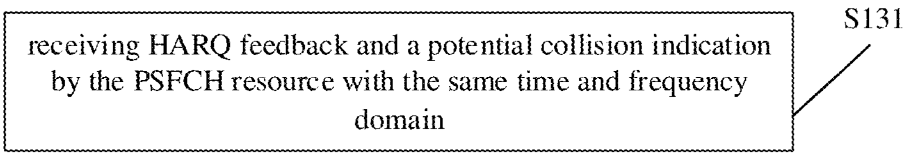
FIG. 18 is a flow chart of a communication method according to some embodiments.

FIG. 18 is a flow chart of a communication method according to some embodiments. As illustrated in FIG. 18, the communication method is applicable to the second UE and includes the following step.

In step S131, HARQ feedback and a potential collision indication are received by the PSFCH resource with the same time and frequency domain.

In some embodiments, a base sequence is received by using the PSFCH resource with the same time and frequency domain and the HARQ feedback and the potential collision indication are determined based on the cyclically shifted base sequence.

In another implementation, in the communication method provided in the embodiment of the disclosure, the potential collision indication and the HARQ feedback may not multiplex the PSFCH resource.

The potential collision indication and HARQ feedback may use the PSFCH resource in an FDM manner. For example, the HARQ feedback and the potential collision indications are received on different frequency domains.

Figure 19:
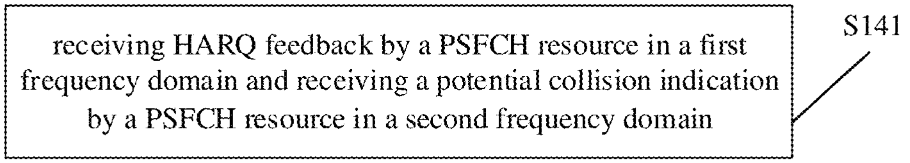
FIG. 19 is a flow chart of a communication method according to some embodiments.

FIG. 19 is a flow chart of a communication method according to some embodiments. As illustrated in FIG. 19, the communication method is applicable to the second UE and includes the following step.

In step S141, HARQ feedback is received by a PSFCH resource in a first frequency domain and a potential collision indication is received by a PSFCH resource in a second frequency domain.

In the communication method provided in the embodiment of the disclosure, different frequency domain resources may be configured for the potential collision indication and the HARQ feedback respectively.

In an implementation, the second UE obtains first indication information and second indication information.

The first indication information is used to indicate a PSFCH resource used for sending the HARQ feedback and the second indication information is used to indicate a PSFCH resource used for sending the potential collision indication.

In an implementation, two parameter values may be introduced in the embodiments of the disclosure to indicate the PSFCH resource used for sending the HARQ feedback and the PSFCH resource used for sending the potential collision indication.

In an example, the parameter value sl-PSFCH-HARQ-RB-Set-r16 is introduced to represent the resource for the HARQ feedback and the parameter value sl-PSFCH-precollsion-RB-Set-r16 is introduced to represent the resource for the potential collision indication.

In the communication method provided in the embodiment of the disclosure, different frequency domain resources may be configured for the potential collision indication and the HARQ feedback respectively by RRC. For example, the parameter value sl-PSFCH-HARQ-RB-Set-r16 for indicating the resource for the HARQ feedback may be introduced in the RRC signaling and the parameter value sl-PSFCH-precollsion-RB-Set-r16 for indicating the resource for the potential collision indication may be introduced in the RRC signaling.

It may be understood that, in the communication protocol of R16, frequency domain resources used for PSFCH transmission among the candidate resources of the PSFCH are pre-configured by RRC and are realized in the frequency domain by the PRB set indicated by a bitmap. In one way, the higher layer parameter sl-PSFCH-RB-Set-r16 BIT STRING (SIZE (10 . . . 275)) is used, which indicates a bitmap with a length of 10 to 275. In the communication method provided in the embodiment of the disclosure, by introducing the following two parameter values, it is ensured that the mapping criteria from PSSCH to potential collision indication and HARQ feedback resources are the same.

Two parameter values:

sl-PSFCH-HARQ-RB-Set-r16 BIT STRING (SIZE (10 . . . 275))

sl-PSFCH-precollsion-RB-Set-r16 BIT STRING (SIZE (10 . . . 275)).

In the communication method provided in the embodiment of the disclosure, the PSFCH resource in the first frequency domain and the PSFCH resource in the second frequency domain have the same time domain resources. That is, the second UE receives the HARQ feedback and the potential collision indication in the same time domain by means of frequency division multiplexing.

In some embodiment, the PSFCH resource in the first frequency domain and the PSFCH resource in the second frequency domain have different time domain resources.

Figure 20:
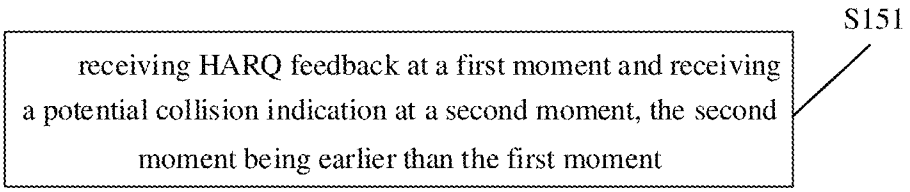
FIG. 20 is a flow chart of a communication method according to some embodiments.

FIG. 20 is a flow chart of a communication method according to some embodiments. As illustrated in FIG. 20, the communication method is applicable to the second UE and includes the following step.

In step S151, HARQ feedback is received at a first moment and a potential collision indication is received at a second moment, and the second moment is earlier than the first moment.

It can be understood that the technical implementation involved in the process of sending the potential collision indication and/or HARQ feedback by the first UE in the embodiments of the disclosure may be applicable to the process of receiving the potential collision and/or HARQ feedback from the first UE by the second UE to perform resource selection in the embodiments of the disclosure. Therefore, for some technical implementation descriptions of the process of resource selection by the second UE, reference should be made to the relevant description in the implementation process of resource selection by the first UE.

It is understood that the communication method provided in the embodiments of the disclosure is applicable to the process of achieving random access parameter configuration during the interaction between the first UE and the second UE. The interaction between the first UE and the second UE to achieve resource selection process is not detailed in the embodiments.

It needs to be noted that, those skilled in the art may understand that various implementations/embodiments involved in embodiments of the disclosure may be used in combination with the above embodiments or may be used independently. Whether independently used or used in combination with the above embodiments, the implementation principles are similar. In embodiments of the disclosure, part of embodiments is illustrated by the implementation used together; it may be understood by those skilled in the art that the examples are not a limitation of embodiments of the disclosure.

According to a same conception, a communication apparatus is further provided in embodiments of the disclosure.

It may be understood that, the communication apparatus provided in embodiments of the disclosure includes hardware structures and/or software modules that perform various functions in order to achieve the above functions. In combination with modules and algorithm steps of examples described in embodiments of the disclosure, the embodiments of the disclosure may be implemented in a form of hardware or a combination of hardware and computer software. Whether a certain function is executed by the hardware or the computer software driving the hardware depends on specific applications and design constraints of the technical solutions. Those skilled in the art may adopt different methods for each specific application to implement the described functions, but such implementation should not be considered as beyond the scope of the technical solutions in embodiments of the disclosure.

Figure 21:
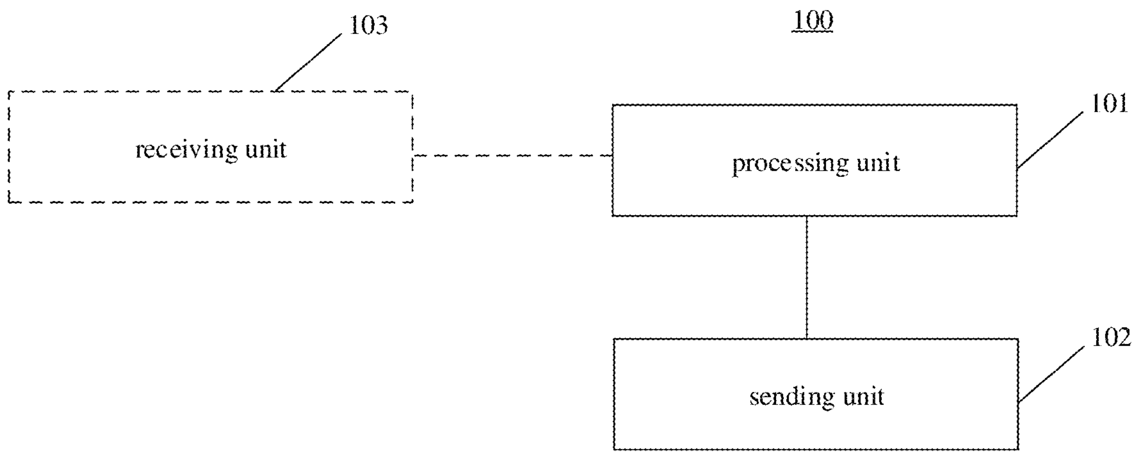
FIG. 21 is a block diagram of a communication apparatus according to some embodiments.

FIG. 21 is a block diagram of a communication apparatus according to some embodiments. Referring to FIG. 21, a communication apparatus 100 is applicable to a first UE. The communication apparatus 100 includes a processing unit 101 and a sending unit 102.

The processing unit 101 is configured to determine an impending resource collision on a reserved resource for data transmission by a second UE. The sending unit 102 is configured to send a potential collision indication to the second UE in response to the processing unit determining the impending resource collision on the reserved resource for data transmission by the second UE, the potential collision indication for indicating the impending resource collision on the reserved resource for data transmission by the second UE.

In an implementation, the sending unit 102 sends the potential collision indication to the second UE by using a PSFCH resource mapped by a first PSSCH transmission resource; in which the first PSSCH is a PSSCH on a slot where a first PSCCH is located and the first PSCCH is a PSCCH for indicating a reserved time-frequency resource for a next PSSCH transmission.

In an implementation, the sending unit 102 is further configured to send HARQ feedback by the PSFCH resource.

In an implementation, the sending unit 102 carries the HARQ feedback and the potential collision indication by a first PSFCH format.

In an implementation, the sending unit 102 sends the HARQ feedback and the potential collision indication by multiplexing the HARQ feedback and the potential collision indication on the PSFCH resource with the same time and frequency domain.

In an implementation, the sending unit 102 sends a base sequence by using the PSFCH resource with the same time and frequency domain and indicates the HARQ feedback and the potential collision indication by shifting cyclically the base sequence.

In an implementation, the sending unit 102 sends the HARQ feedback by a PSFCH resource in a first frequency domain and sends the potential collision indication by a PSFCH resource in a second frequency domain.

In an implementation, the PSFCH resource in the first frequency domain and the PSFCH resource in the second frequency domain have the same time domain resource.

In an implementation, the sending unit 102 sends the HARQ feedback at a first moment and sends the potential collision indication at a second moment, the second moment being earlier than the first moment.

In an implementation, the communication apparatus 100 further includes a receiving unit 103 configured to obtain first indication information and second indication information, the first indication information for indicating a PSFCH resource used for sending the HARQ feedback and the second indication information for indicating a PSFCH resource used for sending the potential collision indication.

In an implementation, the first indication information and the second indication information are carried in an RRC signaling.

In an implementation, a time interval between a moment when the potential collision indication is sent to the second UE and a moment when the impending resource collision occurs on the second UE is greater than or equal to a time interval threshold.

In an implementation, the time interval threshold is determined according to an RRC signaling.

Figure 22:
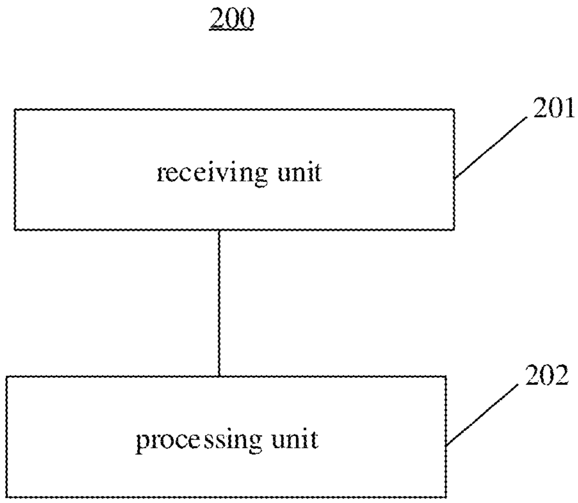
FIG. 22 is a block diagram of a communication apparatus according to some embodiments.

FIG. 22 is a block diagram of a communication apparatus according to some embodiments. Referring to FIG. 22, a communication apparatus 200 is applicable to a second UE. The communication apparatus 200 includes a receiving unit 201 and a processing unit 202.

The receiving unit 201 is configured to receive a potential collision indication from a first UE, the potential collision indication for indicating an impending resource collision on a reserved resource for data transmission by the second UE. The processing unit 202 is configured to perform resource selection according to the potential collision indication.

In an implementation, the receiving unit 201 receives the potential collision indication from the first UE by using a PSFCH resource mapped by a first PSSCH transmission resource; in which the first PSSCH is a PSSCH on a slot where a first PSCCH is located and the first PSCCH is a PSCCH for indicating a reserved time-frequency resource for a next PSSCH transmission.

In an implementation, the receiving unit 201 receives HARQ feedback by the PSFCH resource.

In an implementation, the receiving unit 201 receives the HARQ feedback and the potential collision indication by a first PSFCH format.

In an implementation, the receiving unit 201 receives the HARQ feedback and the potential collision indication by the PSFCH resource with the same time and frequency domain.

In an implementation, the receiving unit 201 receives a base sequence by using the PSFCH resource with the same time and frequency domain and determines the HARQ feedback and the potential collision indication according to the base sequence cyclically shifted.

In an implementation, the receiving unit 201 receives the HARQ feedback by a PSFCH resource in a first frequency domain and receives the potential collision indication by a PSFCH resource in a second frequency domain.

In an implementation, the PSFCH resource in the first frequency domain and the PSFCH resource in the second frequency domain have the same time domain resource.

In an implementation, the receiving unit 201 receives the HARQ feedback at a first moment and receive the potential collision indication at a second moment, the second moment being earlier than the first moment.

In an implementation, the receiving unit 201 obtains first indication information and second indication information, the first indication information for indicating a PSFCH resource used for receiving the HARQ feedback and the second indication information for indicating a PSFCH resource used for receiving the potential collision indication.

In an implementation, the first indication information and the second indication information are carried in an RRC signaling.

In an implementation, a time interval between a moment when the potential collision indication is received and a moment when the impending resource collision occurs on the second UE is greater than or equal to a time interval threshold.

In an implementation, the time interval threshold is determined according to an RRC signaling.

With respect to the apparatuses in the above embodiments, the specific manners for performing operations for individual modules therein have been described in detail in the embodiments regarding the methods, which will not be elaborated herein.

Figure 23:
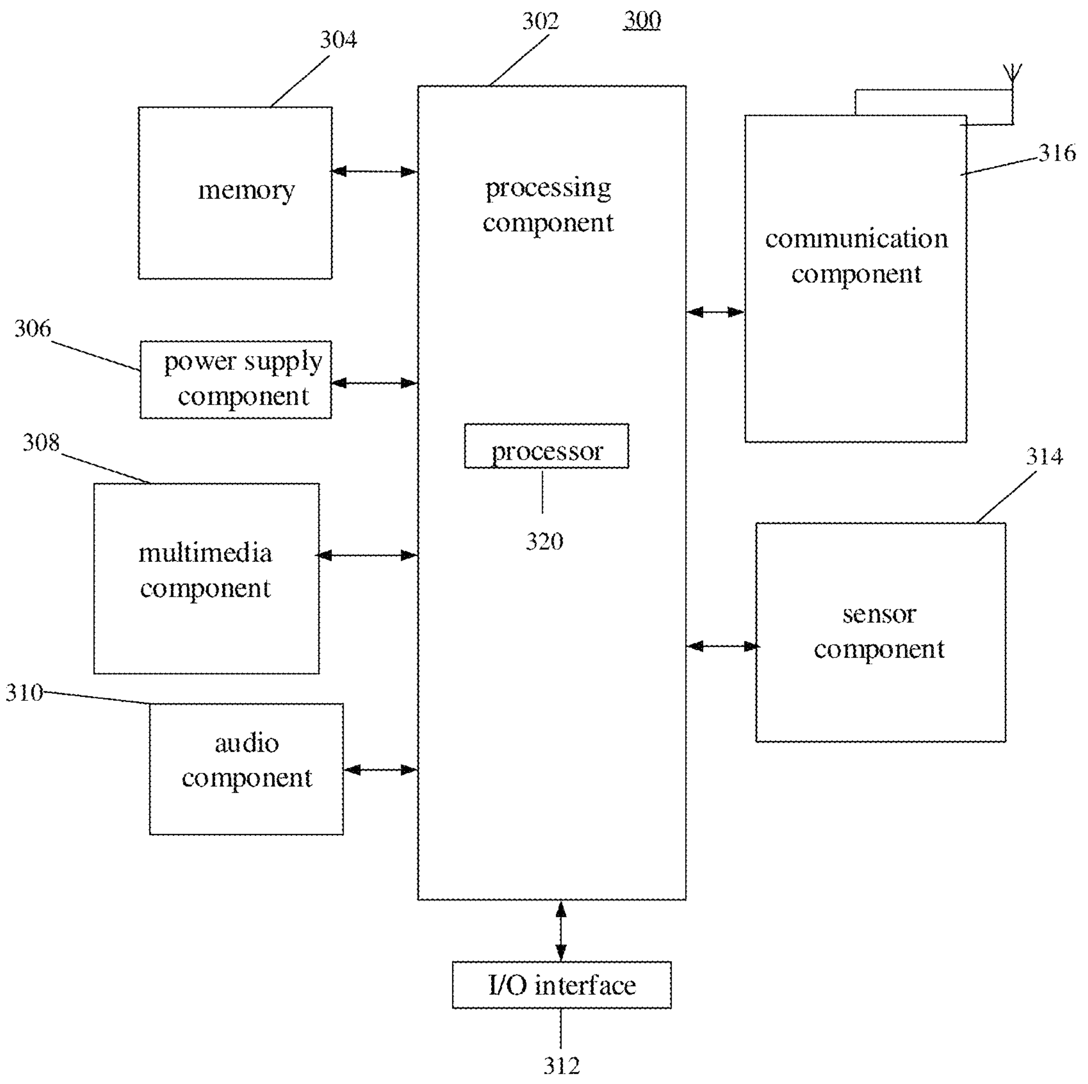
FIG. 23 is a block diagram of a device for communication according to some embodiments.

FIG. 23 is a block diagram illustrating a device 300 for communication according to some embodiments. For example, the device 300 may be the first UE or the second UE in the above embodiments, such as a mobile phone, a computer, a digital broadcasting terminal, a messaging device, a game console, a tablet device, a medical device, a fitness equipment, a personal digital assistant, etc.

As illustrated in FIG. 23, the device 300 may include one or more components: a processing component 302, a memory 304, a power supply component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 306 may provide power to various components of the device 300. The power supply component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, second generation (2G), or third generation (3G), or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

It may be further understood that, "a plurality of" or "multiple" in the disclosure means two or above, which is similar to other quantifiers. The term may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms "a", "the" and "said are also intended to include plural forms, unless the context clearly indicates otherwise.

It should be further understood that, although the terms "first", "second", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structures described above and shown in the drawings, and various modifications and changes may be made without departing from its scope. The scope of the disclosure is only limited by the appended claims. The scope of the disclosure is only limited by the appended claims.

What is claimed is:

1. A communication method, performed by a first user equipment (UE), the method comprising:

sending a potential collision indication to a second UE in response to determining an impending resource collision on a reserved resource for data transmission by the second UE, wherein the potential collision indication indicates the impending resource collision on the reserved resource for data transmission by the second UE, wherein sending the potential collision indication to the second UE comprises: sending the potential collision indication to the second UE by using a physical sidelink feedback channel (PSFCH) resource mapped by a first physical sidelink shared channel (PSSCH) transmission resource, wherein the first PSSCH is a PSSCH on a slot where a first physical sidelink control channel (PSCCH) is located, and the first PSCCH indicates a reserved PSSCH resource with the impending resource collision;

sending hybrid automatic repeat request (HARQ) feedback by a PSFCH resource in a first frequency domain; and sending the potential collision indication by a PSFCH resource in a second frequency domain, wherein the PSFCH resource in the first frequency domain and the PSFCH resource in the second frequency domain have a same time domain resource.

2. The method of claim 1, further comprising:

sending the HARQ feedback and the potential collision indication by a first PSFCH format.

3. The method of claim 2, wherein sending the HARQ feedback and the potential collision indication comprises:

sending the HARQ feedback at a first moment and sending the potential collision indication at a second moment, the second moment being earlier than the first moment.

4. The method of claim 1, further comprising:

obtaining first indication information and second indication information, the first indication information indicating the PSFCH resource used for sending the HARQ feedback and the second indication information indicating the PSFCH resource used for sending the potential collision indication.

5. The method of claim 4, wherein the first indication information and the second indication information are carried in a radio resource control (RRC) signaling.

6. The method of claim 1, wherein a time interval between a moment when the potential collision indication is sent to the second UE and a moment when the impending resource collision occurs on the second UE is greater than or equal to a time interval threshold.

7. The method of claim 6, wherein the time interval threshold is determined according to an RRC signaling.

8. The method of claim 1, wherein the potential collision indication is 1 bit.

9. A communication method, performed by a second user equipment (UE), the method comprising:

receiving a potential collision indication from a first UE, wherein the potential collision indication indicates an impending resource collision on a reserved resource for data transmission by the second UE, wherein receiving the potential collision indication from the first UE comprises: receiving the potential collision indication from the first UE by using a PSFCH resource mapped by a first PSSCH transmission resource, wherein the first PSSCH is a PSSCH on a slot where a first PSCCH is located and the first PSCCH indicates a reserved PSSCH resource with the impending resource collision;

performing resource selection according to the potential collision indication;

receiving hybrid automatic repeat request (HARQ) feedback by a PSFCH resource in a first frequency domain; and receiving the potential collision indication by a PSFCH resource in a second frequency domain, wherein the PSFCH resource in the first frequency domain and the PSFCH resource in the second frequency domain have a same time domain resource.

10. The method of claim 9, further comprising:

receiving the HARQ feedback and the potential collision indication by a first PSFCH format.

11. The method of claim 9, wherein a time interval between a moment when the potential collision indication is received and a moment when the impending resource collision occurs on the second UE is greater than or equal to a time interval threshold.

12. The method of claim 11, wherein the time interval threshold is determined according to an RRC signaling.

* * * * *